3,136,448
COATING COMPOSITIONS

Maurice J. McDowell, Media, Pa., assignor to E. I. du Pont de Nemours and Company, Wilmington, Del., a corporation of Delaware
No Drawing. Filed June 21, 1960, Ser. No. 37,589
17 Claims. (Cl. 220—64)

This invention relates to novel oily liquid butadienoid polymer compositions including an oily liquid copolymer of butadiene-1,3 with alpha methyl styrene in certain pertinent proportions. More particularly, the invention relates to a liquid coating composition having as the essential organic film-forming material, an oily butadienoid hydrocarbon polymer composition including an oily liquid copolymer of butadiene-1,3 with an effective minor proportion of alpha methyl styrene in solution in a volatile liquid organic solvent therefor and containing preferably an effective small proportion of an innocuous metal drier. The invention relates further to a thin-walled metal container having, as a protective lining on the interior surface thereof, a cured thin coating of the above-identified coating composition.

While prior art suggests copolymers of butadiene-1,3 and alpha methyl styrene in the form of resinous and elastomeric materials, low molecular weight oil liquid copolymers having a major proportion of the butadiene-1,3 component and a minor proportion of the alpha methyl styrene component and having the characteristics of a drying oil suitable for coating formulation are not disclosed in the prior art. For example, Gleason U.S. Patent 2,762,851, relating to butadienoid drying oils, teaches in column 2, lines 2 to 10, that while para and meta alkylated homologues of styrene are permissible substitutes for styrene, other closely related compounds such as alpha methyl styrene are virtually useless because of their poisoning effect on the polymerization reaction.

Liquid homopolymers of butadiene-1,3 having drying oil properties are taught by Miller U.S. Patent 2,708,639, the butadiene-1,3 being polymerized in the presence of a BF$_3$-etherate-water complex as the polymerization catalyst.

Use of homopolymers of butadiene-1,3 and hydrocarbon copolymers thereof, characterized as oily liquid polymers having a molecular weight in the range of 700 to 20,000, as an interior coating for sanitary cans is taught in Henderson U.S. Patent 2,875,919. This patent refers to several prior art patents relating to the preparation of the useful oily liquid butadienoid polymers. While the cured coating having a butadienoid hydrocarbon polymer as the essential organic film-forming material is acceptable generally as an interior lining of sanitary containers, referred to generally as the "tin can," certain potable liquid products susceptible to taste degradation packaged in contact with cured coatings formulated with these polymers of butadiene-1,3 are known to develop off-taste. Aqueous alcoholic malt beverages, such as, for example, beer and aqueous carbonated soft drinks, are known to be particularly susceptible to development of off-taste when packaged in metal cans having an interior coating of these prior art butadienoid hydrocarbon polymers.

In studying factors which are contributory to this development of off-taste, inadequate cure of the applied coating is found to be the primary cause. Containers which are coated interiorly with undercured polymer of butadiene-1,3 and stored prior to use in packaging are found to cause progressively worse off-taste in proportion to the storage period prior to filling of the containers. While the temperature-time factor can be altered to improve the cure of the butadienoid coating to a level at which development of off-taste is less significant, high speed commercial fabrication of sanitary cans imposes practical limitations on this temperature-time factor, in reference to both the curing temperature and the time of exposure to the curing temperature.

Ordinarily, sanitary cans used for packaging beer, soft drinks and other potable aqueous beverages are labeled by application of a lithographing indicia varnish to the exterior surface of the can body. One coat of the butadienoid coating composition which becomes subsequently a part of the interior lining of the container is applied to one surface of the sheet metal and cured thereon as a basecoat. The lithographing varnish is applied to the uncoated opposite surface of the sheet metal and dried or cured under conditions peculiar to this indicia varnish. In ordinary practice, the container body is fabricated by forming this precoated sheet metal stock into a seamed tubular body, then applying a topcoat composition over the cured basecoat interior lining of the resulting can body and curing the topcoat. Thereafter, an end closure stamped from sheet metal stock precoated appropriately with butadienoid coating and cured is seamed to one end of the tubular body to provide an open container.

Unfortunately, lithographing varnishes do not have drying or curing requirements equivalent to those of the top-coat composition and are not adequately heat-resistant to baking temperatures which are preferred usually for the topcoat composition. Generally, the indicia varnishes do not tolerate significant exposure to temperatures above 350° F. As a result, practical curing conditions for the topcoat composition applied to the interior surface of a sanitary can body having lithographed indicia on the exterior surface are dictated largely by the tolerance of the lithographic varnish toward the baking temperatures. Thus, the topcoat superimposed on the cured basecoat is cured necessarily under conditions which effect adequate cure at a temperature up to 35° F., preferably no higher than 325° F. Although adequate cure of butadienoid polymer can be effected at a temperature as low as 250° F., the curing period at this temperature is too long ordinarily for high speed commercial fabrication of sanitary cans. Minimum effective cure corresponds to heating under conditions equivalent to at least 5 minutes at 275° F. The preferred maximum cure corresponds to heating under conditions equivalent to 8 minutes at 420° F. Thus, in the presence of the lithographing varnish, curing of the interior coating is limited practically to the rather narrow temperature range of 275° F. to 350° F.

Container end-closures for the tubular body do not carry an indicia varnish ordinarily. Consequently, the protective interior coating on sheet metal stock from which the end-closures are stamped can be applied in a single coat and cured adequately at higher temperatures, i.e., in the temperature range of 350° F. to 420° F. or even higher. In contrast, the interior coating on the can body consists usually of a basecoat cured in the high temperature range prior to lithographing with one or more topcoats superimposed on the cured basecoat after lithographing and cured in the effective lower temperature range for a period preferably ranging from 5 to 15 minutes.

Suitable dry coating weights of the butadienoid polymers range usually from 2 to 15 milligrams per square inch of coated surface. Basecoat dry coating weights range preferably from about 2 to about 6 milligrams and the superimposed topcoat dry coating weights range preferably from 3 to 7 milligrams, although single coats can be applied and cured satisfactorily at a dry coating weight up to 15 milligrams per square inch.

The primary objective of this invention is to provide a butadienoid polymer coating composition which is inhibitive toward the development of off-taste in potable liquids packaged in contact with the coating cured under curing conditions adequate for the butadienoid polymer composition at a temperature at which the lithographic varnish is heat-resistant. Another important object is to provide a sanitary container coated interiorly with a cured butadienoid hydrocarbon polymer composition which is inhibitive toward development of off-taste in potable aqueous liquids packaged in the lined container. Still another object is to provide an improved package consisting essentially of a thin-walled metal container coated interiorly with a cured butadienoid hydrocarbon polymer composition characterized as inhibitive toward development of off-taste in potable aqueous liquids packaged in contact therewith and a content of said potable aqueous liquid which is susceptible to taste degradation.

One solution to these objectives is the subject of copending United States patent application Serial No. 37,590, filed June 21, 1960, in the names of McDowell and Tyson. In the invention claimed therein, the improved coating composition consists essentially of a butadienoid hydrocarbon polymer and a pertinent proportion of channel type carbon black pigment, and preferably containing an innocuous metal drier including an iron drier.

While the invention of the copending application provides an acceptable solution to these objectives, generally black coatings, even on the interior surface of sanitary cans, do not have the aesthetic appeal of transparent coatings.

In the present invention, these objectives, including the provision of preferred transparent coatings, are accomplished through the use, as the essential organic film-forming material, an oily liquid butadienoid polymer composition including an oily liquid copolymer of butadiene-1,3 with up to 20 parts of copolymerized alpha methyl styrene per 100 parts by weight of the copolymer. The minimum effective content of copolymerized alpha methyl styrene in the copolymer or mixtures thereof with other compatible oily liquid polymers of butadiene-1,3 is 2 parts per 100 parts by weight of the butadienoid polymer composition. The preferred content of copolymerized alpha methyl styrene is 5 to 15 parts on the indicated basis. Butadienoid polymer compositions resulting from mixing an oily liquid copolymer of butadiene-1,3 containing up to 20 parts of copolymerized alpha methyl styrene per 100 parts of copolymer with an oily liquid butadiene-1,3 homopolymer in proportions which provide an average of as little as 2 parts of copolymerized alpha methyl styrene per 100 parts of the butadienoid composition are significantly inhibitive toward development of off-taste in comparison with the butadiene-1,3 homopolymer in an otherwise identical coating composition cured under identical curing conditions in the 275° F. to 350° F. temperature range.

Oily liquid polymers of butadiene-1,3 which can be used in combination with the oily liquid copolymers of butadiene-1,3 with alpha methyl styrene to provide a mixed butadienoid polymer composition in practicing this invention include homopolymers, hydrocarbon copolymers of butadiene-1,3 having a content of at least 75% by weight of polymerized butadiene-1,3, and such homopolymers and copolymers modified with up to 2% by weight of an anhydride of an ethylenically unsaturated alpha, beta dicarboxylic acid such as, for example, maleic anhydride. These useful oily liquid polymers of butadiene-1,3 are defined more fully beginning at line 52, column 8 of Henderson U.S. Patent 2,875,919 and in the prior art patents referred to therein. Polybutadiene-1,3 and butadiene/styrene copolymer oil, formerly known as "C" oil, are typical examples of commercially available oily liquid polymers of butadiene-1,3 which can be appropriately blended with the oily liquid copolymer of butadiene-1,3 with alpha methyl styrene.

While the minimum content of 2 parts of copolymerized alpha methyl styrene is operative, a greater margin of safety is desired with a content of at least 5 parts of copolymerized alpha methyl styrene per 100 parts of the butadienoid polymer composition being preferred. At contents in the range of 2 to 5 parts of copolymerized alpha methyl styrene per 100 parts, additional margin of safety can be provided by including the pertinent proportions of the channel type carbon black pigment as taught in the aforementioned copending application. The channel type carbon black can be included with the copolymers having higher contents of copolymerized alpha methyl styrene for advantageous purposes, but presence of this pigment is not essential to the present invention for inhibiting the development of off-taste, inasmuch as these butadienoid polymer compositions containing 5 to 20 parts of copolymerized alpha methyl styrene in 100 parts thereof provide adequate inhibitive margin under ordinary processing conditions in commercial can fabrication.

Use of either copolymers of butadiene-1,3 with more than 20 parts of copolymerized alpha methyl styrene per 100 parts of copolymer or butadienoid hydrocarbon polymer mixtures containing more than 20 parts of copolymerized alpha methyl styrene per 100 parts is undesirable because of the high aromatic hydrocarbon contribution.

Although the prior art teaches that alpha methyl styrene is unacceptable for forming butadienoid copolymers, surprisingly, the above defined useful copolymers of butadiene-1,3 with alpha methyl styrene are prepared satisfactorily by copolymerization in the presence of a cationic polymerization catalyst, preferably $BF_3$-etherate-water complex catalyst. The general polymerization technique using this $BF_3$-etherate-hydrate catalyst as applied to the preparation of oily liquid homopolymers of butadiene-1,3 is described and claimed in Miller U.S. Patent 2,708,639. This general technique is applicable to the preparation of the useful oily liquid copolymers of butadiene-1,3 and alpha methyl styrene.

In a more specific description of the copolymerization, the preferred catalyst consists of a hydrate of boron trifluoride-diethylether complex having the $BF_3$ and diethylether in equal molar proportions. This complex, a known compound, is described in Booth and Martin "Boron Trifluoride and Its Derivatives," John Wiley and Sons, Inc., New York (1949). The water content of the hydrate is pertinent and while the proportion can range from 0.1 mol to 1.4 mols of water per mol of the $BF_3$-etherate, the preferred proportion is in the range of 0.25 to 0.6 mol of water per mol of the $BF_3$-etherate or approximately 3 to 7.5 parts of water per 100 parts by weight of the $BF_3$-etherate. The catalyst proportion is preferably 3 to 6 parts per 100 parts by weight of the charge of polymerizable monomers and is added to the polymerization charge usually at a uniform rate and preferably over the initial quarter to initial half of the total polymerization period.

The polymerization temperature is in the range of about −5° F. to 68° F. generally, but operating in the range of 15° F. to 50° F. is preferred. It is particularly convenient to operate at about 32° F.

The polymerization process is operated usually under autogenous pressure. The polymerization is followed by observation of pressure changes, a cessation of a pressure drop being indicative of completion of the reaction. The period of polymerization varies with the temperature and the catalyst concentration, the reaction being terminated at such time at which the copolymer is an oily liquid characterized by a molecular weight of at least 700 and ordinarily no greater than 10,000, preferably in the range of 1000 to 5000. Usually a polymerization period of 3 to 8 hours under the preferred conditions provides these useful oily liquid copolymers.

The monomer composition can be charged either initially in its entirety or in part with the remainder being added during polymerization. When the initial polymerization charge does not include the alpha methyl styrene, this monomer or a mixture of alpha methyl styrene with a portion of the butadiene-1,3 is added during polymerization, preferably at a uniform rate. Preferably, the initial charge includes a hydrocarbon solvent which serves as a polymerization medium and which may also function as a polymer chain transfer agent, e.g., aliphatic hydrocarbons, hexane, heptane, mineral spirits etc.

Usually the reaction is terminated by addition of calcium hydrate as a slurry in a solvent for the oily liquid copolymer. Thereafter, the unreacted butadiene-1,3 is removed by volatilization at a temperature below the initial boiling temperature of the volatile solvent, preferably no higher than about 150° F. The resulting solution of copolymer is filtered to remove insoluble matter, using a filter-aid such as diatomaceous earth if desired to facilitate filtering.

Coating compositions are prepared from the described useful copolymers or mixtures thereof with other oily liquid polymers of butadiene-1,3 by forming a solution thereof in a volatile liquid organic solvent, including sufficient solvent to provide a suitable application viscosity at a non-volatile content of the butadienoid polymer composition ranging from 10% to 70% by weight, preferably 25% to 60%. For some purposes, a non-volatile content of 5% at coating viscosity is practical.

Any of the volatile liquid organic solvents which are used ordinarily in varnishes, lacquers, enamels and like coating compositions and which has sufficient solvency for the butadienoid polymers to provide liquid compositions at practical coating solids can be used as the solvent. Useful solvents have a boiling range ordinarily in the range of about 80° C. to about 220° C. and are free of residual tailing which may contribute to taste or odor. Preferably, the volatile solvent is a hydrocarbon solvent such as, for example, aliphatic hydrocarbons, petroleum naphthas, mineral spirits, toluol, xylol or mixtures of these hydrocarbons. Mineral spirits, V.M. and P. naphtha, and high solvency petroleum naphthas are particularly preferred as solvents. The volatile portion of the composition comprising a hydrocarbon solvent can include alcohols, esters, ketones, ethers, glycol ethers, glycol esters, and other volatile liquids when it is desirable to modify the hydrocarbon solvent composition advantageously with one portion or more of these non-hydrocarbon liquids. Usually the volatile portion is free of water practically, but proportions of water found ordinarily in commercial dry solvents can be tolerated.

While adequate cure of the applied coating of the butadienoid polymer can be effected at practical temperatures and baking periods in the absence of a drier or curing agent, it is advantageous and preferred to include an effective small proportion of a metal drier in the composition to accelerate the cure. Use of a metal drier is desired particularly when the cure is to be effected at a temperature in the lower portion of the effective curing temperature range. Ordinarily, the minimum concentration of metal drier which provides a significant improvement in the cure of the copolymer corresponds to at least 25 parts of drier metal per million parts by weight of the butadienoid polymer composition. Useful concentrations may range up to 5000 p.p.m. In consideration of the utility of the coating for sanitary cans, the metal drier is necessarily innocuous. Use of lead driers is avoided obviously where the coating is to be in contact with products for human consumption. Useful drier metals include iron, cobalt, manganese, zinc, and other innocuous metals having drier properties or mixtures of metal driers. Iron is particularly preferred and concentrations thereof range preferably from 50 to 3500 p.p.m. Iron driers are preferably included in mixed driers and in such mixtures, the iron is preferably the predominant drier metal. In the absence of the iron driers, the concentration of other drier metals range ordinarily up to 2500 p.p.m., but preferably no greater than 1000 p.p.m. These metal driers can be soluble soaps of higher fatty acids, naphthenates, and other soluble derivatives of the drier metal used ordinarily in coating compositions. Octoate soaps of the drier metals are preferred.

As indicated above, container parts are stamped from precoated sheet metal stock. It is important that the cured coating on this sheet metal stock be resistant to fracturing during the mechanical operations of stamping the parts from the precoated sheet and during fabrication of the sanitary can from the stamped parts. It is necessary also that the coating be resistant to fracturing while in contact with the contents of the can. Since the can contents are heat-processed or pasteurized in the can and the sealed can may be subjected to sub-freezing temperature, fracture-resistance under the physical conditions associated with a temperature range of sub-freezing to 270° F. is important. Effective small proportions of soluble organo-titanium compounds, e.g., tetraoctyl orthotitanate and other titanate esters of volatile alkanols and titanium acylates, as described in Henderson U.S. Patent 2,875,919 are included usually in the coating composition to provide adequate fracture resistance. These titanates can be omitted from the composition when conditions susceptible to causing fractures are not severe, but the presence of the fracture-inhibiting organo-titanium compound is preferred to provide a margin of safety against fracturing. Channel carbon black pigment which exhibits a reinforcing effect on the cured coating enhances fracture resistance and can be used to supplement the organo-titanium compound or in some instances used in lieu thereof. While the proportion of the organo-titanium compound can range usefully up to 5 parts based on 100 parts by weight of the butadienoid polymer composition, a proportion of 1 to 3 parts is preferred.

Another functional modifier present desirably in the liquid coating composition is a liquid methylsiloxane polymer or liquid methylphenyl siloxane polymer. Although not essential to the practice of the present invention, the presence of a small fractional percent, preferably 25 to 500 parts per million parts by weight of the butadienoid polymer, of these methylsiloxane polymers provides improvement in wetting of the metal with the coating and inhibits eye-holing.

As indicated above, the coating preferably is transparent, i.e., unpigmented, but channel type carbon black can be present advantageously. Other innocuous pigments can be included in the coating composition if desired. Usually in pigmented interior can coatings, the organic film-forming material constitutes the major proportion by weight of the cured coating. Titanium dioxide pigment can be used to provide white coatings, zinc oxide pigment can be used as a sulfur sequestering agent when the sanitary can is used for packaging sulfur-liberating food products such as pork and corn, and hydrous iron oxide pigment can be used to provide transparent brown coatings. Ordinarily, inorganic extender pigments and innocuous organic pigments and dyes which are heat-resistant under the necessary curing conditions can be included also.

Compatible resinous materials and plasticizers which do not have a significant taste or odor contribution can be included with the butadienoid polymer and composition as the organic film-forming material. Except for blends of the copolymer with other butadienoid hydrocarbon polymers as described above, the proportion of modifying resins and plasticizers is preferably no greater than about 30% by weight of the total organic film-forming material. Hydrocarbon polymer resins are preferred modifiers for the butadienoid polymer composition and typical of these are polyisobutylene, "Piccopale" hard hydrocarbon resins resulting from polymerization of diene and olefin unsaturates derived from deep cracking of petroleum, these resins having a melting point in the range of from about 70° C. to about 100° C. and "Piccotex" hydrocarbon copolymers of modified styrene having a melting point from about 100° C. to about 120° C.

The following examples are illustrative of preferred embodiments of the invention relating to novel copolymers of butadiene-1,3 and alpha methyl styrene and useful coating compositions formulated therewith which are characterized as being inhibitive to development of off-taste in potable aqueous liquids packaged in contact therewith. In the examples, the indicated parts are on a weight basis unless otherwise designated.

EXAMPLE 1

*Preparation of Butadiene-1,3 Alpha Methyl Styrene Copolymer*

| | Grams |
|---|---:|
| Butadiene-1,3 | 2,000 |
| Alpha methyl styrene | 200 |
| $BF_3$-diethyl ether-$H_2O$ catalyst | 96 |
| Calcium hydrate | 72 |
| Mineral spirits (B.R. 145° to 215° C., A.P. 57° C.) | 1,000 |
| Total charge | 3,368 |
| Recovered copolymer solution | 2,828 |
| Recovered butadiene-1,3 | 532 |
| Loss | 8 |
| | 3,368 |

The butadiene-1,3 is charged into a polymerization vessel and cooled to about −4° F., then the catalyst is added at a uniform rate of about 5 ml. each 5 minutes and the alpha methyl styrene is added at a uniform rate of about 5 grams each 5 minutes, the catalyst being added over a period of 85 minutes and the alpha methyl styrene over a period of 200 minutes starting 15 minutes after the initial catalyst addition. The polymerization is continued for 240 minutes, holding the temperature in the range of −5° F. to about +17° F. The polymerization reaction is stopped by addition of a slurry of 72 grams of calcium hydrate in the mineral spirits. Then the unpolymerized butadiene-1,3 is stripped from the resulting solution of copolymer by heating under reduced pressure to a temperature of about 140° F. over a period of about one hour, 532 grams of butadiene-1,3 being recovered. The solution is filtered to remove insoluble matter. The composition of the resulting copolymer is about 88% by weight of polymerized butadiene-1,3 and 12% of copolymerized alpha methyl styrene. The solution is characterized by a viscosity of about "B" on Gardner-Holdt scale at 77° F. when adjusted to a non-volatile content of 55% by weight with mineral spirits, the non-volatile content being determined by heating a sample thinly spread for 12 minutes at 385° F.

Uncured copolymer recovered from the hydrocarbon solution thereof is an oily liquid residue.

EXAMPLE 2

| Coating composition: | Parts by wt. |
|---|---:|
| Copolymer solution of Example 1—56.4% non-volatile content in mineral spirits | 356 |
| Methylsiloxane polymer (DC-200)—1% in mineral spirits | 4 |
| Tetraoctyltitanate—10% solution in mineral spirits | 40 |
| Iron octoate drier—1% Fe in mineral spirits | 40 |
| Mineral spirits (B.R. 145° C. to 215° C., A.P. 57° C.) | 70 |
| | 510 |

The respective components are combined and mixed until the composition is uniform. The non-volatile content of the composition is about 40% by weight.

A comparative coating composition A is prepared similarly using a solution in mineral spirits of an oily liquid homopolymer of butadiene-1,3 having a molecular weight of about 1500 in place of the solution of the copolymer in Example 2. The homopolymer is prepared following essentially the same technique used in preparing the copolymer. A second comparative composition A–1 is prepared similar to comparative composition A except using heptane as the volatile solvent. The mineral spirits are stripped from the solution of the butadiene-1,3 homopolymer and replaced with heptane and the adjuvants such as metal drier, methylsiloxane polymer and titanate ester are added as solutions in heptane.

These respective coating compositions are applied as a topcoat to the interior surface of sanitary cans of the beer packaging type precoated with a butadiene-1,3 homopolymer basecoat applied at a dry coating weight of about 3 milligrams per square inch of coated surface and cured by baking at 400° F. for 8 minutes. The respective topcoats are applied at a dry coating weight of about 5 to 6 milligrams per square inch of coated surface and cured by baking at 320° F. for 8 minutes.

The resulting coated cans are aged in air for 7 days and then filled with "Purock" pure water, the cans are sealed hermetically with precoated end-closures and the respective contents are pasteurized by heating the filled cans at 150° F. for 30 minutes. After remaining in contact with the respective can coatings for several days, the packaged water is sampled and compared with the original water for off-taste by a panel of tasters.

On the basis of a graduated scale of 0 to 10 where 0 represents no change in taste and 10 represents significantly poor off-taste, the mean off-taste rating of the Example 2 coating is 0 in comparison with a mean off-taste rating of 3 for comparative coating A and 3.5 for comparative coating A–1. Another series of cans is filled with pure water after the can coatings had aged 13 days and 38 days respectively, the cans are sealed, and the water contents are pasteurized. The water in contact with the Example 2 coating is rated 0 at 13 days and 0.5 at 38 days. The water in contact with the comparative coatings is rated 4 to 5 for off-taste. A third comparative composition A–2 similar to A except that the butadiene-1,3 homopolymer is replaced by "C" oil butadiene-1,3/styrene copolymer, having a content of about 20% polymerized styrene, results in a rating of 4.5 for pure water in contact with this A–2 coating after 38 days of aging subsequent to curing at 320° F. for 8 minutes.

Another series of these cans interiorly coated as indicated are filled with beer, the cans are hermetically sealed, and the beer is pasteurized in contact with the coatings. Prior to filling, the respective coated cans are aged seven weeks in air. After several days, the respective packages of beer are sampled and rated for off-taste by an expert beer taster. Included in this series of tests are two additional comparative coatings, i.e., A–3 representing a commercial vinyl chloride/vinyl acetate copolymer beer can topcoat applied over an epoxy resin basecoat and A–4 which is similar to A except that it additionally contains about 10 parts of channel type carbon black pigment per 100 parts by weight of the butadiene-1,3 homopolymer following the teachings of the aforementioned copending U.S. patent application Serial No. 37,590, filed June 21, 1960. The beer samples packaged in contact with the respective cured coating of Example 2, comparative vinyl coating A–3 and comparative butadienoid polymer composition A–4 modified with channel carbon black are all rated OK in reference to off-taste. The beer samples packaged in contact with the respective butadienoid comparative coatings A, A–1 and A–2 are all rated as being significantly off-taste.

EXAMPLE 3

*Preparation of Butadiene-1,3 Alpha Methyl Styrene Copolymer*

| Total charge: | Parts by wt. |
|---|---|
| Butadiene-1,3 | 1,800 |
| Alpha methyl styrene | 400 |
| Hexane | 40 |
| BF$_3$-etherate-water catalyst | 96 |
| Calcium hydrate | 72 |
| V.M. and P. naphtha | 1,000 |
| | 3,408 |

100 parts of the catalyst contains 4.5 parts of water and 95.5 parts of the BF$_3$ diethylether complex.

| | Parts |
|---|---|
| Recovered product | 3,198 |
| Recovered butadiene-1,3 | 148 |
| Loss (butadiene-1,3) | 52 |
| | 3,408 |

The approximate copolymer composition is 1600 parts of polymerized butadiene-1,3 and 400 parts of copolymerized alpha methyl styrene in a total of 2,000 parts.

The monomers and hexane are charged into a polymerization vessel and cooled to about 32° F., the catalyst is added at a uniform rate over an 85 minute period with the reaction temperature held at about 32° F. Polymerization is continued for a total period of about 240 minutes and then the reaction is inhibited by addition of a slurry of the calcium hydrate in the naphtha. Unreacted butadiene-1,3 is stripped from the solution of copolymer and then the solution is held at about 140° F. for 30 minutes. A diatomaceous earth filter-aid is added to the composition and the copolymer solution is filtered free from insoluble matter.

The resulting clear solution of copolymer is characterized by a non-volatile content of 63.1% and a viscosity of about "E" on the Gardner-Holdt scale at 77° F. Uncured copolymer recovered from the naphtha solution is an oily liquid.

EXAMPLE 4

*Preparation of Butadiene-1,3 Alpha Methyl Styrene Copolymer*

| Total charge: | Parts by wt. |
|---|---|
| Butadiene-1,3 | 2,000 |
| Alpha methyl styrene | 100 |
| Hexane | 40 |
| BF$_3$-etherate-water catalyst | 96 |
| Calcium hydrate | 72 |
| V.M. and P. naphtha | 1,000 |
| | 3,308 |

The catalyst is the same as used in Example 3.

| | Parts |
|---|---|
| Recovered product | 2,887 |
| Recovered butadiene-1,3 | 352 |
| Loss (butadiene-1,3) | 69 |
| | 3,308 |

The approximate composition of the copolymer in 100 parts is about 94 parts of polymerized butadiene-1,3 and about 6 parts of copolymerized alpha methyl styrene. Polymerization is carried out as described in Example 3. The filtered solution product is characterized by a non-volatile content of 62% by weight and a Gardner-Holdt viscosity of "E" at 77° F. at this non-volatile content.

Each of these solutions of the respective copolymers are formulated as a coating composition similar to the Example 2 composition using the Example 3 and 4 solutions of copolymer in place of the Example 1 solution of the copolymer at an equal non-volatile content and using V.M. and P. naphtha in place of the mineral spirits. The resulting coating compositions are evaluated as an interior coating for sanitary cans as described in Example 2, rating the off-taste of "Purock" water packaged in contact therewith after the cured coatings had aged 1 week, 2 weeks and 6 weeks. Off-taste results are comparable with those obtained with the Example 2 composition, i.e., the ratings are in the range of 0 to 1 as compared with 3 to 4.5 for the ordinary butadienoid polymer comparative coatings and 0 for the vinyl coating.

EXAMPLE 5

| Coating composition: | Parts by wt. |
|---|---|
| Copolymer solution of Example 4 | 233 |
| Butadiene-1,3 homopolymer—50% in V.M. and P. naphtha | 512 |
| Methylsiloxane polymer—1% in V.M. and P. naphtha | 8 |
| Tetraoctyltitanate—10% in V.M. and P. naphtha | 80 |
| Iron octoate drier—1% Fe in V.M. and P. naphtha | 87 |
| | 1,000 |

The 400 parts of the indicated butadienoid polymer mixture includes 144 parts of the oily liquid copolymer of Example 4 and 256 parts of an oily liquid homopolymer of butadiene-1,3 having a molecular weight of about 1,500. Thus, each 100 parts of the butadienoid hydrocarbon polymer mixture includes about 2.2 parts of copolymerized alpha methyl styrene.

This coating composition when evaluated for inhibition of off-taste development in "Purock" water as described in Example 2 results in a rating of 0 at one week aging and 1 at two weeks.

This coating composition, when applied as a single coat, i.e., without a basecoat, at a drying coating weight of 7.5 milligrams per square inch of coated surface and cured by baking for 13 minutes at 305° F., exhibits excellent inhibition of development of off-taste in beer packaged in contact with the cured coating aged for 1 to 8 weeks prior to filling the coated cans with beer. Under the same conditions, beer packaged in contact with the cured comparative coating having the homopolymer of butadiene-1,3 as the essential organic film-forming material exhibits significant off-taste.

EXAMPLE 6

| Preparation of copolymer: | Pounds |
|---|---|
| Butadiene-1,3 | 500 |
| Alpha methyl styrene | 50 |
| Hexane | 10 |
| BF$_3$-etherate-water catalyst | 24 |
| Calcium hydrate | 18 |
| V.M. and P. naphtha | 132 |
| "Celite" filter aid | 4 |
| | 738 |

The butadiene-1,3 alpha methyl styrene and hexane are charged into a polymerization vessel and cooled to about 32° F. with the pressure being about 1 pound per square inch. The catalyst, consisting of a mixture of 22.92 pounds of BF$_3$ etherate and 1.08 pounds of water, is added at a uniform rate over a period of 85 minutes with the temperature in the reaction vessel being held at in the range of 30°–330° F. A slurry of the calcium hydrate and filter aid in the V.M. and P. naphtha is added to inhibit the reaction after the polymerization has progressed for four hours. Unreacted butadiene-1,3 is stripped from the resulting solution of the copolymer by heating the solution, the temperature thereof rising to about 140° F. in about 120 minutes. The stripped solution is held at this temperature for about 30 minutes. Of the total monomer charge, about 83 pounds of butadiene-1,3 are recovered. The butadiene-1,3 as charged included about 138 p.p.m. of tertiary butyl catechol as inhibitor, about 108 p.p.m. of butadiene-1,3 dimer and about 300 p.p.m. of water. The copolymerization product contains about 10.5 parts of copolymerized alpha methyl styrene and 89.5 parts of polymerized butadiene-1,3 per 100 parts by weight of the butadienoid copolymer.

The copolymer solution is filtered to remove the insoluble matter. The resulting clear solution is characterized by a non-volatile content of 74.5% based on a sample thinly spread, heated for 12 minutes at 385° F. and 75.0% when heated for 10 minutes at 320° F. The solution viscosity at this non-volatile content is $V-\frac{1}{4}$ at 77° F. on the Gardner-Holdt scale. This solution, when thinned with V.M. and P. naphtha to 55% non-volatile content, exhibits a viscosity of about "B" on the Gardner-Holdt scale. Uncured copolymer recovered from the hydrocarbon solution is an oily liquid residue.

EXAMPLE 7

Coating composition:

| | Parts by wt. |
|---|---|
| Copolymer solution of Example 6 | 3,220 |
| 1% solution of liquid methylphenylsiloxane polymer (DC-550) in V.M. and P. naphtha | 48 |
| Tetraoctylorthotitanate | 48 |
| Iron octoate—6% Fe in mineral spirits | 80 |
| V.M. and P. naphtha | 2,744 |
| | 6,140 |

The non-volatile content of this composition is about 40.4% based on a sample thinly spread heated 8 minutes at 320° F.

EXAMPLE 8

Coating Composition

This composition is identical with that of Example 7 except that the indicated content of iron octoate drier is replaced with a mixture of iron octoate and zinc octoate in the proportion of 50 parts of iron and 5 parts of zinc per million parts of the butadienoid copolymer.

Tin-plated sheet steel of the type used in beer can fabrication is coated with the composition of Example 8 as the basecoat at a dry coating weight of about 3 milligrams per square inch of coated surface and the basecoat is cured by heating for 8 minutes at 360° F. Body parts are cut from this basecoated sheet metal and formed into seamed tubular can body parts having the basecoat on the interior surface. The interior surface of the resulting can bodies having the composition of Example 8 as the cured basecoat on the interior surface thereof is coated with the composition of Example 7 at a dry coating weight of about 5 milligrams per square inch and the coating is cured by heating for 8 minutes at 320° F. End-closures are stamped from the sheet metal coated similarly with the composition of Example 8 at a dry coating weight of about 8 milligrams per square inch and cured for about 8 minutes at 360° F. The resulting precoated end-closures are double-seamed to one end of each of the respective precoated tubular body parts. The resulting containers are stored with the interior coating having access to air and after aging periods ranging from 1 to 6 weeks are filled with "Purock" water and beer respectively. The filled containers are sealed hermetically by sealing an end-closure, precoated with the Example 8 composition, to the top of the tubular body. The respective contents are pasteurized and after several days the resulting packages are sampled and evaluated for off-taste. Neither the water nor the beer packaged in contact with the aged butadienoid polymer coating exhibits off-taste. A comparative container having the butadiene-1,3 homopolymer composition A applied similarly as a topcoat over the Example 8 composition as the basecoat caused significant off-taste in the packaged water and beer.

EXAMPLE 9

Coating composition:

| | Parts by wt. |
|---|---|
| Copolymer solution of Example 6 | 2,690 |
| Liquid methylphenylsiloxane polymer solution—1% in V.M. and P. naphtha | 40 |
| Tetra-2-ethylhexyl orthotitanate | 40 |
| Iron octoate—6% Fe | 89 |
| "Piccopale" 100 or "Piccopale" 70 hydrocarbon resin | 667 |
| V.M. and P. naphtha | 1,800 |
| | 5,326 |

"Piccopale" 100 and 70 hydrocarbon resins commercially available from Pennsylvania Industrial Chemical Corporation are characterized respectively by Ball and Ring melting points by 100°±3° C. and 70°±3° C. "Piccopale" 100 is further characterized by:

| | |
|---|---|
| Acid number | less than 1. |
| Saponification number | less than 2. |
| Corrected iodine number | about 30. |
| Molecular weight | about 1100. |
| Double bonds per mol | about 1. |

In this formulation, the organic film-forming materials are in the proportion of about 75 parts of the butadienoid polymer composition and 25 parts of the modifying hydrocarbon resin ("Piccopale") for a total of 100 parts by weight. The proportion of iron catalyst is about 2,000 parts of Fe per million parts of the organic film-forming solids.

Containers having the cured coating of the Example 9 as the interior lining thereof are prepared as described in Example 8 substituting the composition of Example 9 for both the Example 8 basecoat and the Example 7 topcoat.

Taste results for "Purock" pure distilled water and beer packaged in the resulting coated container in which the cured coating has aged during exposure to air over a period of from one to six weeks prior to filling of the respective containers shows no significant off-taste contribution by the cured interior coating of the container.

Although the butadienoid coatings of this invention are used preferably either as a topcoat in combination with other butadienoid basecoats or as the sole interior coating of the sanitary can, they are effective also when used as a topcoat in combination with ordinary basecoats in commercial use for interior can lining, e.g., oleoresinous varnishes, phenol resin baking varnishes, epoxy resin varnishes and drying or semi-dry oil modified epoxy ester varnishes. In such combinations where the ordinary basecoat is applied at a dry coating weight of about 2 to 6 milligrams per square inch, the invention compositions are applied as a topcoat at a dry coating weight of about 3 to 10 milligrams per square inch, preferably 4 to 7 milligrams.

While use of the invention coatings is directed primarily to coating of the interior of cans used in packaging potable aqueous liquids such as beer, soft drinks and the like, they can be used generally for the interior lining of sanitary cans used in the food canning industry where the product is usually wet-packed and heat-processed or pasteurized in the can.

Although sheet steel and protectively plated sheet steel represent the major proportion of sheet metal used in container fabrication, aluminum is being used also in thin-walled containers used for packaging wet-pack products. The invention coatings are effective as an interior lining for thin-walled aluminum cans.

While the several examples are illustrative of the products and processes of the invention, it is apparent that many widely different embodiments of the invention can be made without departing from the spirit and scope thereof, and therefore, it is intended not be limited except as defined by the appended claims.

I claim:
1. A curable liquid coating composition in 100 parts by weight thereof consisting essentially of 5 to 70 parts of (A) an oily liquid butadienoid polymer composition consisting essentially of an oily copolymer of butadiene-1,3 and alpha methyl styrene, as the essential organic film-forming material, in solution in (B) a volatile liquid organic solvent comprising a hydrocarbon solvent for (A), said oily copolymer being characterized by a content of 75% to 98% by weight of polymerized butadiene-1,3 and 2% to 20% of polymerized alpha methyl styrene, a molecular weight in the range of 700 to 10,000, and as being the copolymer product of solution polymerization of a monomer mixture consisting essentially of said comonomers in solution in an organic liquid medium consisting essentially of a hydrocarbon solvent for said monomer mixture and copolymer thereof in contact with a $BF_3$ etherate hydrate catalyst having a content of 0.1 to 1.4 mols of water per mol of the $BF_3$ etherate whereof the $BF_3$ is complexed with diethylether in about equal molar proportions.

2. A liquid coating composition of claim 1 wherein (A) said butadienoid polymer composition consists of a combination of said copolymer of butadiene-1,3 and alpha methyl styrene and another oily liquid polymer of butadiene-1,3 having a content of at least 75% by weight of polymerized butadiene-1,3, the proportion of said copolymer being sufficient to provide a content of at least 2% of polymerized alpha methyl styrene based on the weight of said butadienoid composition (A).

3. A liquid coating composition of claim 2 wherein (A) said butadienoid polymer composition consists of said copolymer of butadiene-1,3 and alpha methyl styrene and an oily liquid homopolymer of butadiene-1,3.

4. A liquid coating composition of claim 1 which further contains (C) an innocuous soluble drier of a siccative metal of the group consisting of iron, cobalt, manganese and zinc, said drier composition being present in a proportion, per one million parts by weight of (A) said butadienoid polymer composition, of 25 to 5000 parts, calculated as siccative metal, of which at least 25 parts are siccative iron.

5. A liquid coating composition of claim 1 further containing (D) a liquid methyl siloxane polymer in the proportions of 25 to 500 parts per million parts of (A) said butadienoid polymer composition.

6. A liquid coating composition of claim 1 further containing (E) a soluble organo-titanium ester of a volatile alkanol and a titanium acylate in an effective proportion up to about 5 parts per 100 parts of (A) said butadienoid polymer composition sufficient to enhance the fracture resistance of the coating in its cured state.

7. A liquid coating composition of claim 4 wherein (C) said siccative drier metal composition consists essentially of siccative iron drier present in the proportion of 50 to 3500 p.p.m. on said basis, and further contains (D) 25 to 500 p.p.m., based on the weight of (A), of a liquid polydiorganosiloxane wherein said organo substituent joined directly to the silicon atom is selected from the group consisting of methyl and phenyl, and (E) a soluble tetraalkyl orthotitanate ester proportion of 1 to 3 parts per 100 parts by weight of (A).

8. A heat-curable liquid coating composition of claim 1 which further contains as film-forming material hydrocarbon resin compatible with (A) said oily liquid butadienoid polymer composition, soluble in said solvent (B), and characterized by a melting point in the range of 70° C. to 120° C. and as being a substantially saturated resinous product of polymerization of diene and mono-olefin unsaturates resulting from deep cracking of petroleum, the total hydrocarbon film-forming material consisting essentially of up to 30% by weight of said hydrocarbon resin and complementally at least 70% of (A) said liquid butadienoid polymer composition consisting essentially of said copolymer of butadiene-1,3 and alpha methyl styrene, the proportion of said copolymer being sufficient to provide at least 2% of polymerized alpha methyl styrene based on the weight of said hydrocarbon film-forming material.

9. A metal sheet having a thin contiguous layer of heat-cured coating resulting from heat-curing in-situ the uncured coating composition defined by claim 1, said heat-curing being effected under time and temperature conditions equivalent to heating in the range of from 275° F. for 5 minutes up to 420° F. for 8 minutes, said uncured coating composition being applied at a coating weight equivalent to a dry coating weight in the range of 2 to 15 milligrams per square inch of coated surface.

10. A metal sheet having a thin contiguous layer of heat-cured coating resulting from heat-curing in-situ the uncured coating composition defined by claim 7, said heat-curing being effected under time and temperature conditions equivalent to heating in the range of from 275° F. for 5 minutes up to 420° F. for 8 minutes, said uncured coating composition being applied at a coating weight equivalent to a dry coating weight in the range of 2 to 15 milligrams per square inch of coated surface.

11. An interiorly-lined thin-walled metal container having on the inner surface thereof at least one coat, including an exposed topcoat layer, of a heat-cured coating resulting from heat-curing in-situ an uncured coating composition as defined by claim 1, said heat-curing being effected under time and temperature conditions equivalent to heating in the range of from 275° F. for 5 minutes up to 420° F. for 8 minutes, said uncured coating composition being applied at a coating weight equivalent to a dry coating weight in the range of 2 to 15 milligrams per square inch of coated surface.

12. An interiorly-lined thin-walled metal container having on the inner surface thereof at least one coat, including an exposed topcoat layer, of a heat-cured coating resulting from heat-curing in-situ an uncured coating composition as defined by claim 7, said heat-curing being effected under time and temperature conditions equivalent to heating in the range of from 275° F. for 5 minutes up to 420° F. for 8 minutes, said uncured coating composition being applied at a coating weight equivalent to a dry coating weight in the range of 2 to 15 milligrams per square inch of coated surface.

13. A package consisting essentially of a thin-walled metal container having a tubular body portion, a bottom portion and a top portion including a closure, the interior surface of said metal container having at least one coat, including a topcoat layer, of cured coating composition resulting from heat-curing in-situ a heat-curable liquid coating composition as defined by claim 1, said heat-curing being effected under conditions equivalent to heating in the range of from 5 minutes at 275° F. to 8 minutes at 420° F., said heat-cured coating being present at a total dry coating weight ranging from 3 to about 15 milligrams per square inch of coated surface of which at least 3 milligrams per square inch constitute topcoat layer, and said package having a content of potable aqueous liquid in direct contact with said cured topcoat layer.

14. A package consisting essentially of a thin-walled metal container having a tubular body portion, a bottom portion and a top portion including a closure, the interior surface of said metal container having at least one coat, including a topcoat layer, of cured coating composition resulting from heat-curing in-situ a heat-curable liquid coating composition as defined by claim 7, said heat-curing being effected under conditions equivalent to heating in the range of from 5 minutes at 275° F. to 8 minutes at 420° F., said heat-cured coating being present at a total dry coating weight ranging from 3 to about 15 milligrams per square inch of coated surface of which at least 3 milligrams per square inch constitute topcoat layer, and said package having a content of potable aqueous liquid in direct contact with said cured topcoat layer.

15. A method of manufacturing an interiorly-coated metal sanitary container characterized as being inhibitive toward development of off-taste in potable aqueous liquids packaged in direct contact with the interior coating thereof which comprises the steps of applying at least one coat of a curable liquid coating composition as defined by claim 1 to interior-forming surfaces of a thin-walled metal container in an amount sufficient to provide a dry coating weight of 2 to 15 milligrams per square inch of coated surface and heat-curing the applied coating under conditions ranging from at least equivalent to heating for 5 minutes at 275° F. and no greater than those equivalent to heating for 8 minutes at 420° F.

16. The method of claim 15 which includes preliminary steps of applying to said interior-forming surfaces of the metal container an organic film-forming basecoat composition contiguous with the metal at a dry coating weight of about 2 to 6 milligrams per square inch of coated surface and curing said applied basecoat, said defined curable coating composition consisting essentially of (A) said butadienoid polymer composition in solution in (B) being superimposed on said basecoat at a dry coating weight of at least 3 milligrams per square inch of coated surface.

17. A liquid coating composition of claim 6 further containing (D) a liquid methyl siloxane polymer in the proportions of 25 to 500 parts per million parts of (A) said butadienoid composition.

References Cited in the file of this patent
UNITED STATES PATENTS

| | | |
|---|---|---|
| 1,939,621 | Bruson | Dec. 12, 1933 |
| 2,072,770 | Reid | Mar. 2, 1937 |
| 2,855,376 | Shotton et al. | Oct. 7, 1958 |
| 2,863,786 | Guth et al. | Dec. 9, 1958 |
| 2,875,919 | Henderson | Mar. 3, 1959 |
| 2,917,391 | Canniff et al. | Dec. 15, 1959 |

UNITED STATES PATENT OFFICE

CERTIFICATE OF CORRECTION

Patent No. 3,136,448                                    June 9, 1964

Maurice J. McDowell

It is hereby certified that error appears in the above numbered patent requiring correction and that the said Letters Patent should read as corrected below.

Column 2, line 38, for "35° F." read -- 350° F. --;
column 10, line 67, for "30°-330° F." read -- 30°-33° F. --.

Signed and sealed this 20th day of October 1964.

(SEAL)
Attest:

ERNEST W. SWIDER
Attesting Officer

EDWARD J. BRENNER
Commissioner of Patents